Sept. 11, 1956   R. HEINZE ET AL   2,762,080
METHOD OF MANUFACTURING CYLINDRICAL
BODIES BEARING GRAPHIC SYMBOLS
Filed March 25, 1952
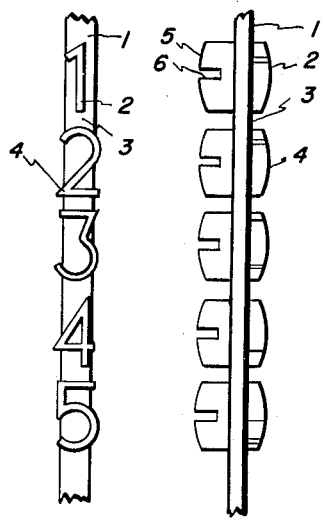
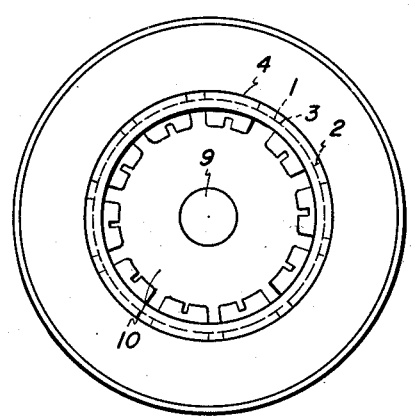
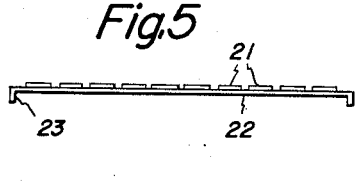
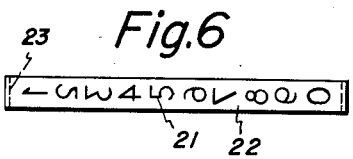
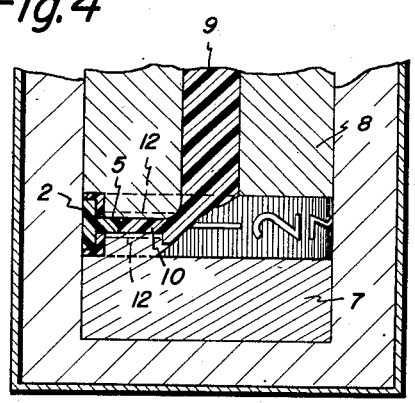
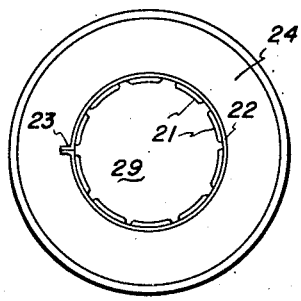
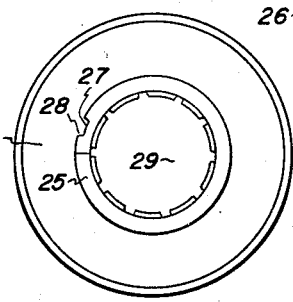
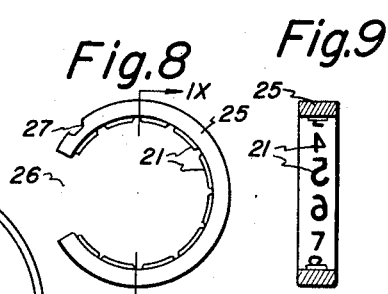
INVENTORS
RICHARD HEINZE
BY KURT ALTMANN
*Attorneys*

United States Patent Office 2,762,080
Patented Sept. 11, 1956

2,762,080

METHOD OF MANUFACTURING CYLINDRICAL BODIES BEARING GRAPHIC SYMBOLS

Richard Heinze and Kurt Altmann, Herford, Germany

Application March 25, 1952, Serial No. 278,524

9 Claims. (Cl. 18—59)

This invention relates to a method for manufacturing cylindrical bodies bearing graphic symbols and is particularly concerned with rolls bearing figures in highly precise arrangements.

The primary object of our invention is to simplify, cheapen, and speed up the manufacture of the cylindrical bodies referred to.

To the accomplishment of the foregoing main object and other more detailed objects which will hereinafter appear, our invention consists in a method for the manufacture of cylindrical bodies bearing graphic symbols, as described in the following specification and sought to be defined in the claims.

The specification is accompanied by a drawing in which:

Fig. 1 is a fragmentary plan view of a resilient strip of bodily figures, embodying features of our invention;

Fig. 2 is a side elevation thereof;

Fig. 3 illustrates a roll in a mold in which the roll has been molded, the roll having a strip of bodily figures circumferentially inserted therein;

Fig. 4 is a partially sectioned side elevation of the mold and numeral roll;

Fig. 5 is a side elevation of a modified resilient numeral strip, the numerals being negatives;

Fig. 6 is a plan view of the strip of Fig. 5;

Fig. 7 shows a mold having the strip of Figs. 5 and 6 inserted therein;

Fig. 8 is a side elevation of a further modification of a resilient numeral strip, the strip being ring-shaped;

Fig. 9 is a section taken in the plane of the line IX—IX of Fig. 8; and

Fig 10 illustrates a mold with the resilient ring of Figs. 8 and 9 inserted therein.

Referring to the drawing, in the numeral strip 1 of Figs. 1 and 2, the bodily digits 2 are connected by narrow resilient bridges 3. The surface 4 of the digits is curved so that the strip when bent into circle form will fit exactly the curvature of a mold to be used for making a roll bearing the symbols which appear bodily on the strip 1. The roll is made by inserting the strip in the mold. Due to our invention, it will be unnecessary to machine the surface of the finished roll. Polishing alone will do, but even polishing will not always be necessary.

Each bodily Figure 2 is provided with two slightly chamfered or tapered extensions 5 which are separated by a recess 6. Each recess 6 receives a small registering pin of the mold to ensure exact positioning of the figures in the mold. When the numeral strip 1 is inserted between the mold halves 7 and 8 (see Figs. 3 and 4), the latter engage the extensions 5 and hold them in place. With the numeral strip inserted and the mold being ready for operation, the material which is to be shaped in the mold is fed into the mold through a central opening 9, filling all cavities and pressing the strip firmly against the mold circumference. Since there are no projecting parts, the molded piece 10 can easily be removed from the mold after pressing. The strip with the bodily digits has become a part of the finished roll.

In Fig. 4, the strip is shown to be provided with two collar-shaped rims 12 which serve to cover the extensions 5 and to prevent them from being visible if of contrasting color and if two rolls are assembled in adjacent relationship.

Our invention offers the advantage of making it possible to work with several exchangeable molds, preferably a set of two molds of which one mold will be in the press, while the numeral strip is being inserted in the other mold outside the press. It is also possible to increase considerably the capacity of any given press by handling in one press a large number of molds or a multiple cavity mold for the numeral strip, and in another press a plurality of molds or a multiple cavity mold for the roll, the present roll mold being smaller than the molds heretofore used.

Both plastics and metals or metal alloys may be used for the numeral strips and the numeral molds.

Referring to Figs. 5 to 10, the numeral strips shown are provided with negative digits.

According to Fig. 5, the negative digits 21 are arranged on a thin straight strip 22 in a raised fashion, the strip being provided with short rectangularly bent end portions 23.

The strip is made of thin enough material so that it may resiliently be bent, after being embossed in its flat condition, into a circle of the diameter of the numeral rolls to be produced, whereupon the circular strip is placed in the cylindrical molds 24 (see Fig. 7), the digits looking inwardly. The end portions 23 serve to locate the strip in the mold. After insertion of the strip 22, the mold is closed and the roll material is injected. The roll is removed together with the strip. The strip can then be taken from the roll by pulling on an end 23, leaving the digit impressions in the roll.

Both injection molds and die casting molds for the numeral rolls for use in the method according to the invention are much simpler and cheaper to produce than those of conventional designs since the mold parts are perfectly smooth except for a locating groove. Radial cores are not required. This makes for very small overall dimensions so that a large number of such molds, for example, 16 to 20, can readily be combined in a block.

Numeral strips provided with negative characters can most simply be produced by engraving a die, providing the die either with raised or depressed positive characters, and by stamping a steel strip with this die, or by forcing suitably prepared steel into the die, the forced-in steel forming the numeral strip.

According to our invention, it is also possible to produce a flat strip of relatively great thickness bearing negative characters, again by means of a die, then to bend the strip into an open elastic ring, and to harden the ring. Such a numeral strip is illustrated in Fig. 8. The elastic ring 25 of a relatively heavy section is normally open at 26, closes the gap when inserted into a mold, and opens again when released. It bears negative bodily digits 21 at its inner circumference. A notch 27 is preferably located near one end, which notch registers with a corresponding projection 28 of the mold 24 (see Fig. 10). When after molding, the finished piece 29 is ejected together with the numeral ring 25, the ring will, while recovering its open form, release the work piece 29 without requiring a special operation.

On a finished roll, the contours of the digits may be filled, or the raised digits may be colored in the usual way. It is an added advantage of the invention that no flash will form on the outer surface of the numeral rolls, as was the case with conventional processes using cores.

Since it is possible to use multiple molds without a corresponding increase in the first cost of the mold, the method of the invention results in savings not only because of the elimination of cores but also by reducing labor otherwise required and by permitting a more economical use of the presses as compared to cored molds. It is true, the insertion of the numeral strips in the method according to the invention requires an extra workman, but the resulting cost is negligible as compared to the savings due to increased machine capacity and cheaper molds.

The process as applied to the showing of Figs. 5 to 10 may also be used for the manufacture of numeral rolls and similar devices both from plastic material or metal since highly alloyed steel may be used for the numeral strips, which steel will come off from the injected metal. It is advisable to lubricate the molds with vaseline or other suitable material for easier parting.

From the foregoing detailed description it will be apparent that according to my invention any graphic symbol, such as letters, figures, are bodily provided in form of a resilient strip. The strip is inserted in a mold to form cylindrical bodies bearing the same symbols as the strip.

For direct or positive lettering, the strip is embedded in plastic material or in metal of contrasting color by injection molding, pressing, etc. The bodily characters of the strip then become integrally associated with the filler material or the base, and the whole has a perfectly smooth surface. Soiling is not likely to occur, but any soil deposited can readily be removed.

The invention may also be practiced by embossing a flexible strip with negative characters of any kind. The embossed strip is placed into a cylindrical mold with the raised characters facing the center of the mold, whereupon the base material which may be a plastic or metal is injected. After molding, the strip is taken off from the molded body.

It will be understood that while we have shown and described our invention in a few forms only, many changes and modifications may be made without departing from the spirit of the invention defined in the following claims.

We claim:

1. Method of manufacturing bodies having at least one substantially smooth cylindrical composite surface, which surface bears a plurality of symbols therein, comprising the steps of preparing at least one resilient strip of symbol bodies connected with each other, each of said bodies having a substantially flat face adapted for forming part of said cylindrical composite surface, inserting said strip in a mold having at least one cylindrical molding surface so as to lie with said flat faces of said symbols against said cylindrical molding surface, and feeding moldable material into said mold to form a body embedding said strip, including the same to form an integral body therewith, and being provided with said cylindrical composite surface composed of the flat faces of said bodies and the remaining part of cylindrical composite surface being formed by said moldable material.

2. In the method according to claim 1, feeding a moldable material of a color which contrasts with that of the strip into said mold.

3. In the method according to claim 1, inserting said strip in a mold provided with collar-shaped rims to cover parts of the strip to make them invisible upon assembling two such molds one adjacent to the other.

4. In the method according to claim 1, providing the strip with positioning means, and inserting same in a mold provided with complementary means to ensure exact positioning of the strip in the mold.

5. In the method according to claim 1, centrally charging the mold with softened plastic material to cause the plastic to press the strip firmly against the mold circumference.

6. Method of manufacturing bodies having at least one substantially smooth cylindrical composite surface bearing a plurality of symbols therein which includes preparing a connected series of symbol bodies, each of said bodies having a substantially flat face adapted for forming said cylindrical composite surface, said bodies being connected by at least one resilient bridge, inserting said bridge-connected series circumferentially in a mold having at least one cylindrical molding surface so that said flat faces lie flush with said cylindrical molding surface, and then feeding a moldable material into the mold so as to form a composite body with said bridge-connected series of symbols, which body has at least one substantially smooth cylindrical composite surface, which surface is formed by said cylindrical molding surface, said body embedding said bridge-connected symbols to form an integral body therewith, said flat faces of said bodies forming part of the cylindrical composite surface of said body.

7. Method of manufacturing cylindrical bodies having a substantially smooth peripheral composite surface, which surface bears a plurality of symbols therein, comprising the steps of preparing a resilient strip of symbol bodies connected with each other, each of said bodies having a substantially flat face adapted for forming part of said cylindrical composite surface, inserting said strip in a mold having a cylindrical cavity so as to lie with said flat faces of said bodies against the cylindrical wall of said cavity, and feeding moldable material into said cavity to form a cylindrical body embedding said strip and including the same to form an integral body therewith, the cylindrical surface of which body comprises the flat faces of said bodies so as to form said substantially smooth composite surface.

8. Method of manufacturing cylindrical bodies having at least one substantially smooth cylindrical composite surface bearing a plurality of symbols therein which includes preparing a connected series of symbol bodies, each of said bodies having a substantially flat face adapted for forming said cylindrical composite surface, said bodies being connected by at least one resilient bridge, inserting said bridge-connected series circumferentially in a mold having a cylindrical cavity so that said flat faces lie flush with the cylindrical wall of said cavity, and then feeding a moldable material into the mold so as to form a cylindrical composite body with said bridge-connected series, the surface of which is formed by said cylindrical wall, said body embedding said bridge-connected symbols to form an integral body therewith, said flat faces of said bodies forming part of the cylindrical composite surface of said body.

9. Method of manufacturing bodies having at least one substantially smooth cylindrical composite surface, which surface bears a plurality of symbols therein, comprising the steps of preparing at least one resilient strip of symbol bodies connected with each other, each of said bodies having a substantially flat face adapted for forming part of said cylindrical composite surface, inserting said strip in a mold having at least one cylindrical molding surface, said substantially flat faces of said bodies being provided with a curvature corresponding to the circumference of said cylindrical molding surface so as to lie with said flat faces of said symbols against said cylindrical molding surface, and feeding moldable material into said mold to form a body embedding said strip, including the same to form an integral body therewith, and being provided with said cylindrical composite surface composed of the flat faces of said bodies and the remaining part of cylindrical composite surface being formed by said moldable material.

References Cited in the file of this patent

UNITED STATES PATENTS

| | | |
|---|---|---|
| 423,002 | Van Dyke | Mar. 11, 1890 |
| 1,286,681 | Loundenbeck | Dec. 3, 1918 |
| 1,319,107 | Novotny | Oct. 21, 1919 |
| 1,377,506 | Novotny | May 10, 1921 |
| 1,377,508 | Novotny | May 10, 1921 |
| 1,435,020 | Nye | Nov. 7, 1922 |
| 2,137,986 | Sanford | Nov. 22, 1938 |
| 2,492,973 | Dofsen | Jan. 3, 1950 |

OTHER REFERENCES

Serial No. 391,198, Chapuis (A. P. C.), published June 15, 1943.